ns310B2" />

United States Patent
Gaumnitz et al.

(10) Patent No.: US 9,792,310 B2
(45) Date of Patent: Oct. 17, 2017

(54) RUN INDEX COMPRESSION

(71) Applicants: Gordon Gaumnitz, Walldorf (DE); Lars Dannecker, Dresden (DE)

(72) Inventors: Gordon Gaumnitz, Walldorf (DE); Lars Dannecker, Dresden (DE)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 14/699,464

(22) Filed: Apr. 29, 2015

(65) Prior Publication Data

US 2016/0321323 A1 Nov. 3, 2016

(51) Int. Cl.
*G06F 17/00* (2006.01)
*G06F 17/30* (2006.01)

(52) U.S. Cl.
CPC .............................. *G06F 17/30336* (2013.01)

(58) Field of Classification Search
CPC ................................................ G06F 17/30336
USPC ........................................................ 707/693
See application file for complete search history.

(56) References Cited

U.S. PATENT DOCUMENTS

| 6,529,554 | B1 * | 3/2003 | Craver | H04N 19/176 |
| | | | | 348/423.1 |
| 7,952,499 | B1 * | 5/2011 | Crivat | H03M 7/46 |
| | | | | 341/50 |
| 9,098,537 | B2 * | 8/2015 | Moore | G06F 17/30306 |
| 9,665,611 | B2 * | 5/2017 | Moore | G06F 17/30306 |
| 2009/0319549 | A1 * | 12/2009 | Millett | G06F 17/30961 |
| 2011/0016157 | A1 * | 1/2011 | Bear | G06F 17/30312 |
| | | | | 707/804 |
| 2013/0086353 | A1 * | 4/2013 | Colgrove | G06F 3/0608 |
| | | | | 711/206 |
| 2014/0074805 | A1 * | 3/2014 | Kapoor | G06F 17/30501 |
| | | | | 707/693 |
| 2014/0181052 | A1 * | 6/2014 | Moore | G06F 17/30306 |
| | | | | 707/687 |
| 2015/0106382 | A1 * | 4/2015 | Liu | G06F 17/30315 |
| | | | | 707/744 |
| 2015/0379073 | A1 * | 12/2015 | Verma | G06F 17/30324 |
| | | | | 707/715 |

OTHER PUBLICATIONS

Abadi, Daniel J., et al., "Integrating Compression and Execution in Column-Oriented Database Systems", SIGMOND 2006, Chicago, IL, Jun. 27-29, 2006, pp. 671-682.*

(Continued)

*Primary Examiner* — Robert Stevens
(74) *Attorney, Agent, or Firm* — Mintz Levin Cohn Ferris Glovsky and Popeo, P.C.

(57) ABSTRACT

A database can receive a query from a remote computing system. The database can include (i) a linear run length encoded compressed column, based on an original column of time series data partitioned into runs containing consecutive values and generated by run length encoding, (ii) a run index comprising at least one run index value having a run index position, the at least one run index value identifying runs in the original column, and (iii) an offsets column identifying the run index positions corresponding to the runs that contain a desired value. Using the run index, data responsive to the query can be identified. The identified data responsive to the query can be transmitted by the database to the remote computing system.

20 Claims, 11 Drawing Sheets

(56) References Cited

OTHER PUBLICATIONS

Przymus, Piotr, et al., "Compression Planner for Time Series Database with GPU Support", TLDKS XV, LNCS 8920, Springer-Verlag, Berlin, Germany, © 2014, pp. 36-63.*

Abadi, Daniel J., et al., "Column-Stores vs. Row-Stores: How Different Are They Really?", SIGMON '08, Vancouver, BC, Canada, Jun. 9-12, 2008, pp. 967-.*

* cited by examiner

| value | runs |   |   | value | runs |   |   | value | runs |   |   |
|---|---|---|---|---|---|---|---|---|---|---|---|
| 0 | 0 | 1 | 2 | 4 | 2 | 3 | 4 | 8 | 4 | 5 | 6 |
| 1 | 0 | 1 | 2 | 5 | 2 | 3 | 4 | 9 | 4 | 5 | 6 |
| 2 | 0 | 1 | 2 | 6 | 2 | 3 | 4 | 10 | 4 | 5 | 6 |
| 3 | 0 | 1 | 2 | 7 | 2 | 3 | 4 | 11 | 4 | 5 | 6 |

Checkpoint Compression

Compression Advisor

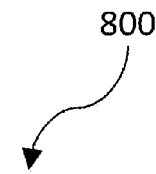

| horizontal / vertical | no compression | Linear RLE | Checkpoint compression |
|---|---|---|---|
| no ranging | consumes maximal memory | medium memory consumption | - |
| dynamic ranging | slower access due to binary search | medium memory consumption but slower access | non-constant Bulk loading frequency - ideal in memory consumption but suffers in access time |
| constant ranging | lower memory consumption depending on range | constant bulk loading frequency, but with occasional misplaced runs | constant Bulk loading frequency - ideal in memory consumption and access time |

Fig. 8

RUN INDEX COMPRESSION

TECHNICAL FIELD

The subject matter described herein relates to compression of reference indexes for consecutive data values.

BACKGROUND

Time-series data, which is data stored in a format typically containing a time column corresponding to an associated data column, can be indexed by, for example, fully inverted indexes that list all occurrences of each value in the data column.

The time column can also benefit from simple, but memory intensive, index structures. Linear Run Length Encoding (RLE), which combines continuous runs of values, can be scanned for a specific value or a range of values by looking at each run instead of looking at each value. Inside a run, which is defined by its start position, start value and length, the position of an included value can be calculated by adding the run's start position to the value's position inside the run, which is given as the difference between the value itself and the run's start value.

A well-sorted time series contains exactly one run per series in the time column. Thus, a value of interest can be easily found in each time series, if contained. Accordingly, an additional index is not needed. However, in practice data is typically loaded bulk-wise, for example, in groups where the time column entries repeat or reset. In this case, the data contains more than one run. Depending on the bulk load frequency the number of runs in the time column can arbitrary increase.

SUMMARY

The subject matter described herein is directed to systems, apparatus, methods, and computer program products related to the compression of indexes referencing sequential values, or runs, in a column of data or time values. The method of compression is based upon an analysis of the run index and chosen based on the analysis, and optionally on a determination of the memory consumption of each available method.

In a first aspect, a database can receive a query from a remote computing system. The database can include (i) a linear run length encoded compressed column, based on an original column of time series data partitioned into runs containing consecutive values and generated by run length encoding, (ii) a run index comprising at least one run index value having a run index position, the at least one run index value identifying runs in the original column, and (iii) an offsets column identifying the run index positions corresponding to the runs that contain a desired value. Using the run index, data responsive to the query can be identified. The identified data responsive to the query can be transmitted by the database to the remote computing system.

In some variations one or more of the following features can optionally be included in any feasible combination.

The linear run length encoded compressed column can include a first column and a second column, each having at least one value with a corresponding position. The position of the desired value in the original column can be determined based on the desired value, the value in the first column, and the value in the second column.

The run index can be partitioned into at least one run partition having a run partition position. The values of the run index can correspond to the position in the first column and the second column and the run partition position of the run index correspond to runs in the original column that contain the desired value.

The offsets column can include at least one offsets column value having an offsets column position with the offsets column value corresponding to the position of the run index and the desired value corresponding to the offset column position.

Run partitions that are identical can be grouped into a vertical grouping and run partitions with consecutive run partition values into a horizontal grouping. A vertical compression can be determined for the vertical grouping and a horizontal compression for the horizontal grouping. The vertical compression can be one of dynamic ranging compression or constant ranging compression. The horizontal compression can be one of linear run length encoding compression or checkpoint compression. Once a compression is determined, the vertical compression and/or the horizontal compression can be applied to the run index.

Determination of the compression can include performing constant ranging compression when the original column contains runs having a constant number of values, performing dynamic ranging compression when the original column contains runs having a varying number of values, determining an average number of consecutive values in the runs, performing linear run length encoding compression when the average number is two or less, and performing checkpoint compression when the average number is greater than two.

In some variations, the following can be determined: a first memory consumption for no horizontal compression, a second memory consumption for linear run length encoding compression, and a third memory consumption for checkpoint compression. The original column can be compressed according to the compression corresponding to the lowest of the first memory consumption, the second memory consumption, and the third memory consumption.

The database can also include a ranged run index for constant ranging compression and including at least one value and a corresponding position, where the at least one value corresponds to the position in the second column. The database can also include a second offsets column having at least one value and a corresponding position, where the value in the second offsets column can correspond to a starting position in the ranged run index. The difference between the values in the second offsets column can determine a range of positions in the ranged run index, beginning with the starting position, and the position in the second offsets column can correspond to the range of values in the second column containing the desired value.

The database can include a ranges column for dynamic ranging compression and having at least one value and a corresponding position, where the values in the ranges column can correspond to a range in which the desired value is found, and the position corresponding to the range can correspond to the positions in the second offsets column.

The database can include a second ranged run index for run length encoding compression. The second ranged run index having can have a third column and a fourth column, each having at least one value having a corresponding position. The value of the third column can correspond to the position in the first column and the position in the second column. The difference of consecutive values in the fourth column can correspond to a range of positions in the first and second column, starting with the position in the second column determined by the value in the third column. The database can also include a third offsets column including at least one value having a corresponding position, where the value in the third offsets column can correspond to a starting position in the fourth column of the second ranged run index, the difference between the values in the third offsets column can determine a range of positions in the second ranged run index, beginning with the starting position, and the position in the third offsets column can correspond to the range of values in the second column containing the desired value.

The database can further include a ranged checkpoint index for ranged checkpoint compression and including at least one value having a corresponding position, where the value in the ranged checkpoint index can correspond to a starting position in the linear run length encoded compressed column. The difference between the values in the ranged checkpoint index can determine a range of positions in the linear run length encoded compressed column, beginning with the starting position, and the position in the ranged checkpoint index can correspond to the range of values in the second column containing the desired value.

A first position can be determined in the offsets column that is the same as the desired value and a second position in the offsets column immediately subsequent to the first position. A first range of positions in the run index can be determined beginning with the first position and continuing up to, but not including, the second position. A second range of positions can be determined in the run length encoded compressed column that have the same positions in the run length encoded compressed column as the values in the determined range first range of positions. The positions of the desired value in the original column can be determined by, for each position in the second range, adding the desired value to the value of the second column corresponding to the position in the second range and subtracting the value of the first column corresponding to the position in the second range.

Computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other aspects will now be described in detail with reference to the following drawings.

FIG. 8 is a diagram illustrating features of a compression advisor;

DETAILED DESCRIPTION

Figure 1:
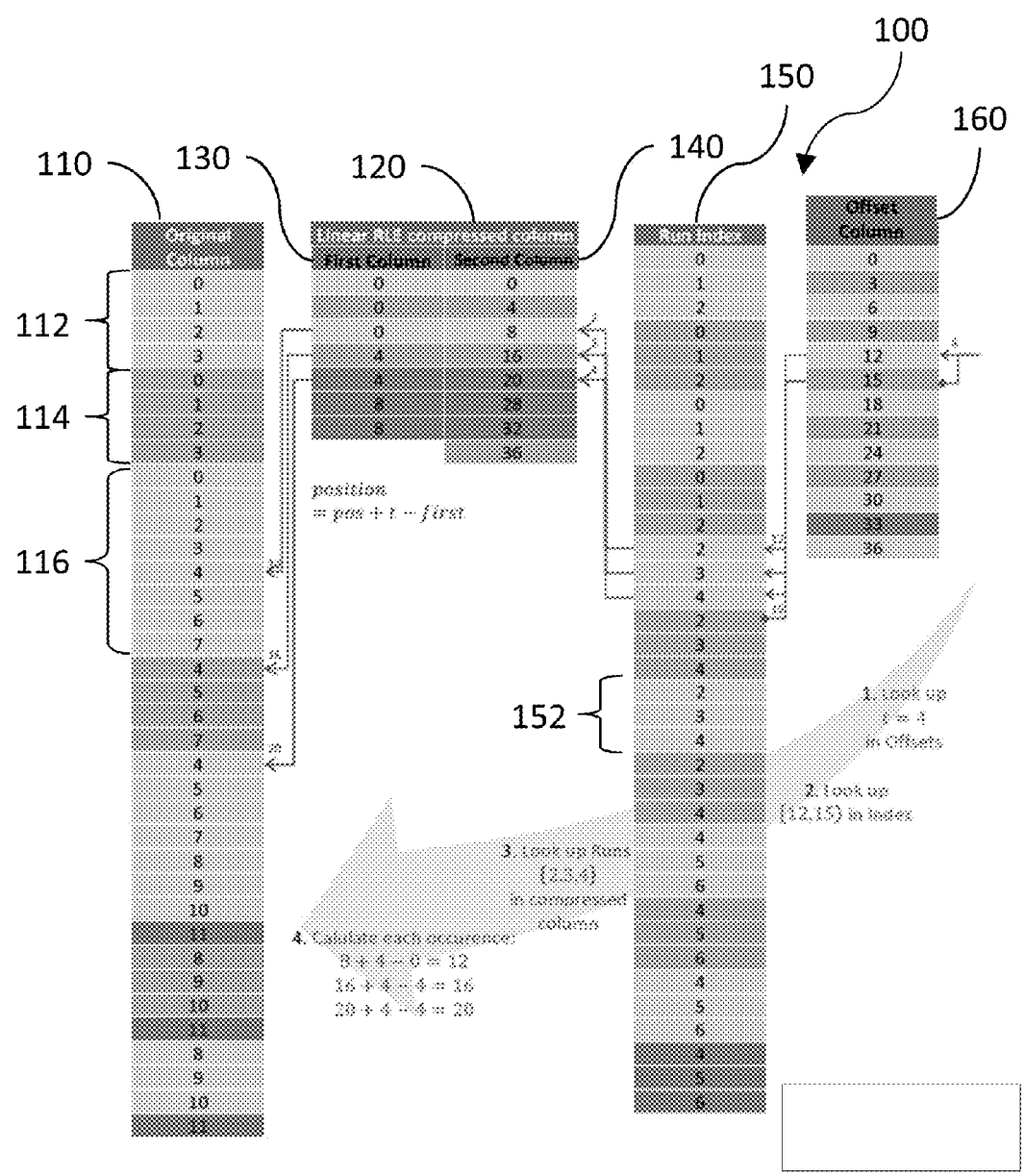
FIG. 1 is a diagram illustrating a run index referencing values in runs present in an original column of data.

This document describes systems and methods for compressing run indexes (herein also referred to as run indexes). Run indexes enable a rapid look-up of values in a column of data, which might be compressed with any run length encoding, however, uncompressed run indexes can contain nearly as many entries as the original column itself. Depending on the features of the run index, different compression methods can be applied that significantly reduce the number of entries (and resulting memory utilization) of the run index, while still enabling rapid look-up of original column values.

Also, as used herein, the term "column" can refer to any collection of data. For example, any of the columns shown can be arrays, tables, vectors, dictionaries, etc. Illustrating them as columns is simply a way to visualize the data.

By way of introduction, time series data is often presented as a time value and a data value for the corresponding time value. For example, a temperature sensor may record the temperature (the data) at regular intervals, e.g., each second, minute, hour, etc. In the example of an hourly measurement, the tabulated time series can have a time column and a data column. The time column might then include 1, 2, 3, . . . 24, then start from 1 again for the following day. Each repetition of the time values can be considered a "run," which is characterized by consecutive values. To continue the example, if data was taken over a week, there could be seven runs, each with run values from 1 to 24.

Another layout arises for usage of multiple sensors. For example, temperature sensors may record the temperature (the data) at regular intervals, e.g., each second, minute, hour, etc. In the example of an hourly measurement, the tabulated time series database can have an optional sensor id column, a time column and arbitrary many data columns. The time column might then include 00:00, 02:00, 03:00, . . . , 23:00 for one sensor, then start from 00:00 again for the next sensor, etc. and restarts with the first sensor at the following day. In this example, each repetition of the time values for each sensor per day can be considered a "run," which is characterized by consecutive values. Herein we refer to this scheme as bulk loading.

The system may use Dictionary Compression to represent time values (such as "1. January 2000 00:00:00.00000") in a distinct dictionary, while the time column contain numerical references into the dictionary.

One common complication is that the length of the runs may not always be constant. Again, using our example of temperature measurements, if data was taken for four hours, but at varying times of the day, there could be runs such as [3, 4, 5, 6], [13, 14, 15, 16], etc. Yet another complication can be introduced if the runs are not of equal length. For example, during one day the resulting run could be [3, 4, 5, 6], but the next day the resulting run could be [13, 14, 15, 16, 17, 18, 19]. Thus, any representation of data can contain runs of varying length, strung together to form a long column of data.

FIG. 1 is a diagram 100 illustrating a run index 150 referencing values in runs present in an original column 110 of data.

The original column 110 can contain entries corresponding to any type of data (time, position, velocity, etc.). The original column 110 can be sorted, or can have an ordering as a result of sequential or consecutive additions to the original column 110, for example, the uploading of data at periodic times, as mentioned above. In the example of FIG. 1, the original column 110 can be seen to contain a number of runs. The first run 112 is [0, 1, 2, 3], the second run 114 is [0, 1, 2, 3], the third run 116 is [0, 1, 2, 3, 4, 5, 6, 7], and so on.

The original column 110 can be compressed into a linear RLE compressed column 120. The linear RLE compressed column 120 is a compressed version of the original column 110 because it contains, in a first column 130 and a second column 140, all of the information required to reconstruct the original column 110, but without storing the intervening values present in each of the runs. The entries in the linear RLE compressed column 120 refer to the starting values and starting positions of the runs present in the original column 110. It is important to note that for the linear RLE compressed column 120, and in fact all columns referred to within the application, zero-based indexing will be used. For example, as shown in the first row of the linear RLE compressed column 120, the first run 112 (in the original column 110) has a start value of 0 and starts at position 0. The second run 114 has a start value of 0 and starts at position 4, and so on.

Given a linear RLE compressed column 120, the run index 150 can be constructed by creating two vectors. The run index 150, which is the first vector composed of positions and corresponding values, contains run partitions 152, which are a collection of runs. For each distinct value in the original column 110 there is one run partition 152 in the run index 150. The purpose of each run partition 152 is to list all the runs where the corresponding value occurs. For example, for the value 0 in the original column 110, it occurs in runs 0 (the first run), 1, and 2. Similarly, the value 4 occurs in runs 2, 3, and 4. The second vector, called offset column 160, lists all the start positions for each run partition in the run index 150 and thus indicates the actual partitioning of the run index 150.

One example of using the columns specified above to look up the occurrences of a value in the original column 110 is shown by the arrows connecting each column. In this example, it is shown how to look up occurrences of the number 4 in the original column 110. Representing the value to be found by the variable t, the offset column 160, which contains the indices of each run partition 152, is accessed at index t and t+1. Doing so, the borders α and β of the partition P=[α, β) that contains all the occurrences of t in the actual run index 150 are found. Thus, to locate the occurrences of the value 4, the offset column 160 is accessed at rows 4 and 5 to identify the partition P=[12, 15). We indicated the access to t+1=15 in the offset column 160 with a diamond header, since the value indicates the first row in the run index 150 we are not interested in. The partition [12,15) provides information on which runs have to be scanned in the linear RLE compressed column 120 by scanning the rows $\{r_{12}, r_{13}, r_{14}\}$ in the run index 150. In this case, the run values from the run index are {2, 3, 4}. Scanning a run r=(value, position) from the linear RLE compressed column 120 to find the original column 110 position p of the value t can be done using $$p = \text{start position} + t - \text{start value}. \tag{1}$$

For example, t can be found in the run with the start value 0 starting at index 8. Calculating the exact position in the original column 110 using Eq. (1) we arrive at the final index 12.

Also, the run index 150 can also be used to search for time frames efficiently by selecting multiple partitions via the offset column 160. For instance, when searching for all occurrences within the time frame t=[2, 6) the rows 2 and 6 are selected from the offset column 160 to find the borders α=6 and α=18. Once the borders have been found, the procedure above can be used to return all indices corresponding to the values in the time frame t.

In the example of FIG. 1, the run index 150 has exactly the same number of elements, n, as the original column 110. This is because the run index 150 lists all occurrences for all values. Even if the run index 150 stores runs instead of real occurrences, one run can only contain a value once and accordingly it contains as many values as the original column 110. Therefore, the only benefit in using a run index instead of an inverted index directly storing occurrences is that the numbers for the run values in a run index are smaller. This is because the linear RLE compressed column 120 is designed to contain significantly less runs than the original column 110 has values, which in turn means that the maximum run index value in a run index 150 is typically significantly smaller than n−1 but in worst case it is equal to n−1. For this reason, bit compression, which benefits from smaller values, is on average much more effective when the run index 150 stores runs instead of indices.

Also, storing runs instead of indices enables us to apply further compression techniques, which are elaborated in the following sections. One technique exploits the repetitions inside the run index 150, which can be seen in FIG. 1. To reduce the overall memory consumption of the run index 150, we want to combine equal run information for conjoined original column 110 values.

Figure 2:
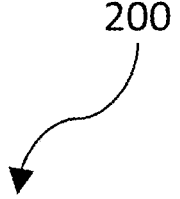
FIG. 2 is a table illustrating the run index grouped by partitions into horizontal and vertical groupings.

FIG. 2 is a diagram 200 including a table illustrating the run index 150 grouped by partitions into horizontal and vertical groupings. The run index 150 in FIG. 1 is a column (the run index 150) partitioned by other columns (the run partitions 152). This can also be seen in the tabular representation of the run index 150 shown in FIG. 2 in which the run partitions 152 are displayed as rows and the runs in which a value occurs are illustrated as columns. For instance, our example value t=4 occurs in the runs {2, 3, 4}.

In this example, two features that are interesting for compression can be observed. First, information for consecutive rows is often identical. For example, the values 4, 5, 6, and 7 are all occurring in the runs 2, 3, and 4. Accordingly, the first direction of optimization can be vertical. We will introduce two approaches for vertical compression in the discussion of FIGS. 4 and 5. Second, the run index 150 often contains consecutive values in its partitions, which are illustrated as rows in the tabular representation. Accordingly, the second class of optimization can be horizontal. The consecutive values in the run partitions 152 are a perfect candidate for linear RLE compression, which we discuss in FIG. 6. Also, using checkpoint compression as a horizontal compression in is discussed in FIG. 7.

Figure 3:
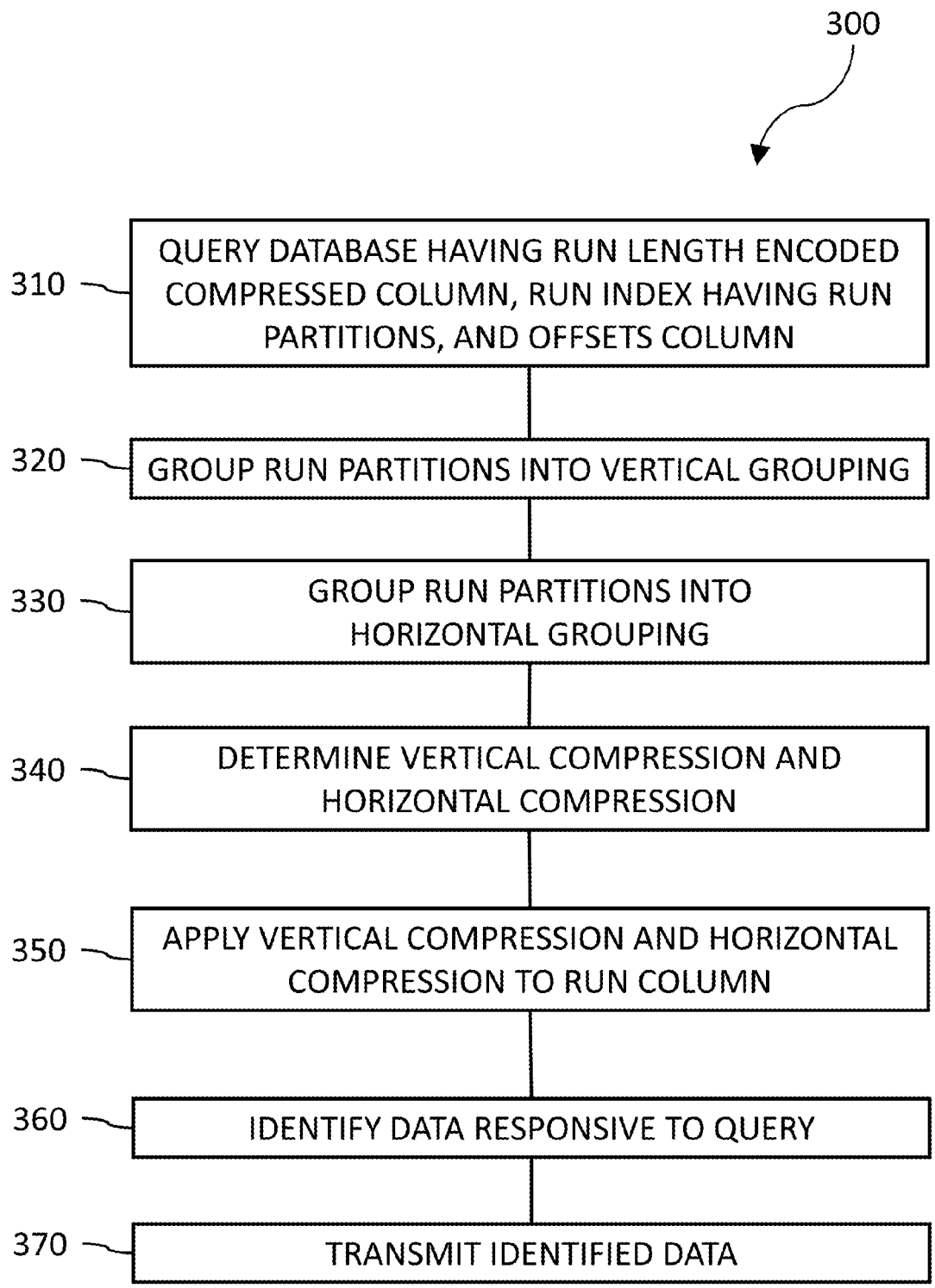
FIG. 3 is a process flow diagram illustrating determining a vertical compression and a horizontal compression.

FIG. 3 is a process flow diagram 300 illustrating determining a vertical compression and a horizontal compression. The features described above and in FIGS. 1 and 2 can be represented by the process flow diagram 300 illustrated in FIG. 3. At 310, a database can be queried, where the database includes an original column 110 containing values, with each value having a corresponding position (0, 1, 2, etc.). The original column 110 can also include runs containing consecutive values.

There can be a linear RLE compressed column 120 in the database which describes the runs present in the original column 110 containing values, with each value having a corresponding position (0, 1, 2, etc.). The linear RLE compressed column 120 can include a first column 130 and a second column 140, each having a position and a value. For any given run, the value in the first column 130 can correspond to the first value in the run. Similarly, the corresponding value in the second column 140 corresponds to the starting position of the run in the original column 110.

There can further be a run index 150 in the database which describes the runs in the original column 110. The run index 150 can be further partitioned into at least one run partition 152 where the run values in the run partition 152 correspond to the position of the second column 140 of the linear RLE compressed column 120. Also, it can be seen that the $i^{th}$ run partition corresponds to a value in the original column 110. For example, run partition 0 (the first one in the run index in the zero-based indexing scheme), identifies the runs in the original column 110 where the value 0 can be found, in this case 0, 1, and 2.

There can also be an offset column 160 which describes the entries in the run index 150 referencing runs in which the desired value are found.

At 320, the run partitions 152 can be grouped into a vertical grouping. The vertical grouping can be based on the features of the run partitions 152. For example, identical run partitions 152 for consecutive values of the original column 110 can indicate that vertical compression methods can be employed.

At 330, the run partitions 152 can be grouped into a horizontal grouping. The horizontal grouping can also be based on the features of the run partitions 152. For example, when considering consecutive runs, i.e. when each consecutive run is in some way different than the prior run, if the values in the run partitions 152 are consecutive, or nearly so, then horizontal compression methods can be employed.

At 340, a vertical compression can be determined for the vertical grouping and a horizontal compression can be determined for the horizontal grouping.

At 350, the run index 150 can be compressed according to the vertical compression and the horizontal compression determined at 340.

At 360, the database can identify, using the run index 150, data responsive to the query.

At 370, the database can transmit, to the remote computing system, the identified data responsive to the query.

Figure 4:
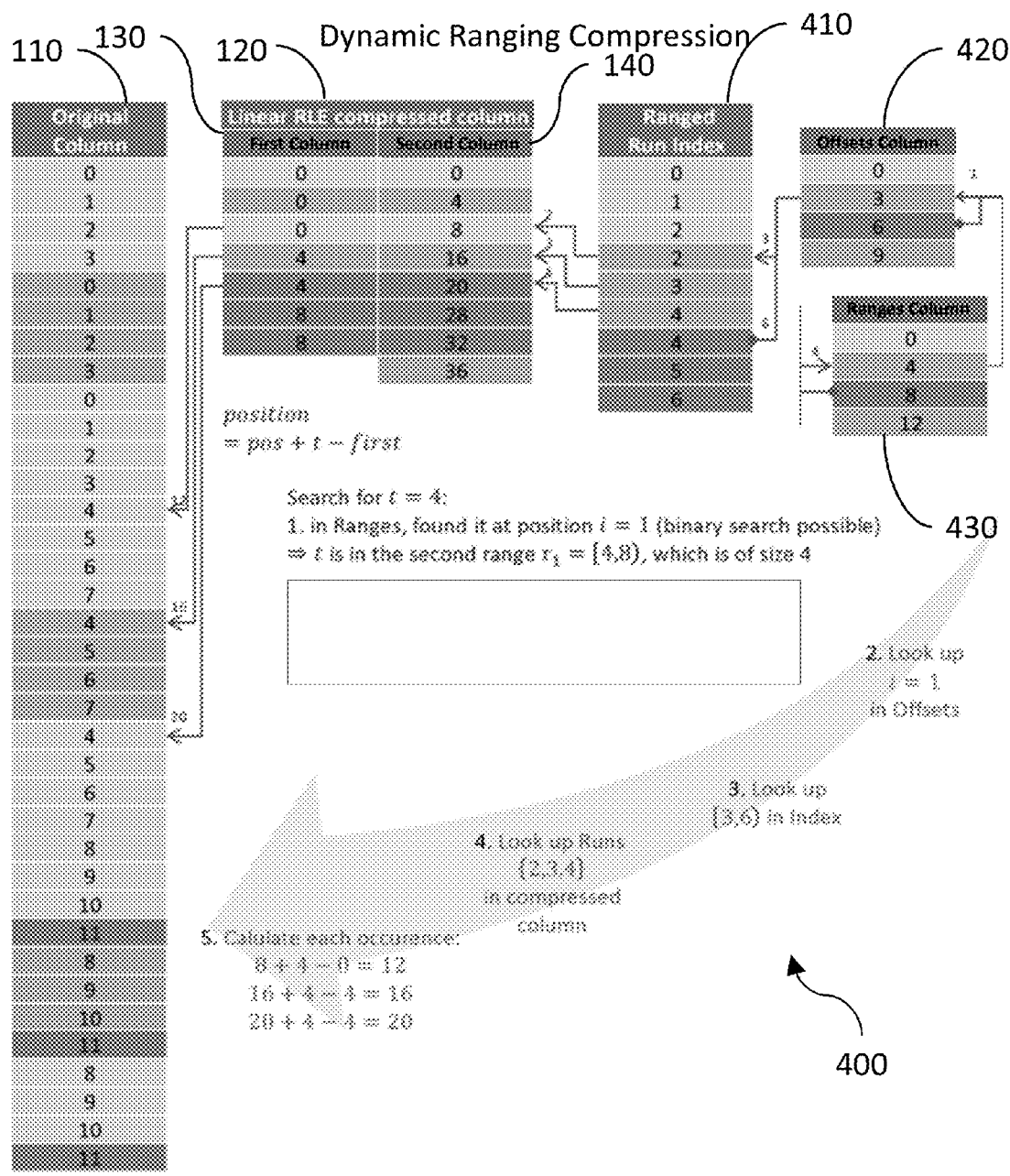
FIG. 4 is a diagram illustrating dynamic ranging compression.

FIG. 4 is a diagram 400 illustrating dynamic ranging compression. Referring back to FIG. 2, one approach for a vertical optimization, which is designed to eliminate redundant information for several values, can be to combine adjacent equal run partitions such that they are valid for multiple values. For instance, the value 0 is contained in the runs 0, 1, and 2, which is equal to the run partitions for values 1, 2, and 3. As a result, the sequence, or range, 0, 1, and 2 occurs in the run index multiple times. The reason for this is that, for example, with daily bulk loading, each original column 110 is appended with the same values during a day. Thus, it arises that the original column 110 contains repeated runs. For this reason, the run index 150 (shown in FIG. 1) lists the same runs for each time stamp in this period. Hence, the run index 150 contains identical information for several values. To avoid storing this redundant information, these equal portions are consolidated to one partition, which uses the offset column accordingly, to identify these partitions when accessing the run index 150. However, a direct access of the offset column by using the given value to identify the borders of a run partition 152 is not possible anymore. This is because there is no one-to-one mapping between values and run partitions 152 when using ranging.

To address this, as shown in FIG. 4, an additional ranges column 430 adds this mapping from values to run partitions 152. The ranges column 430 stores, for each run partition 152, the smallest value for which the run partition 152 contains run information. Implicitly, the following row in the offsets column 420 points to the smallest value for which the run partition 152 is not valid anymore. Hence, when searching for occurrences of a specific value, a binary search on ranges column 430 provides a position in the offsets column 420 of the corresponding run partition 152 in the ranged run index 410. Having this position in the ranges column 430 in hand, the offset column 420 can be accessed accordingly to access the ranged run index 410 analogous to the original run index 150.

In FIG. 4, the example indicated with arrows shows a search for the value t=4. The ranges column can be accessed to find the value 4 at position 1. This is illustrated using a line next to the ranges column 430 from which an arrow and a diamond point to the range [4,8) the value t is located in. Accordingly, the offsets column 420 can be accessed at position 1 to find the partition P=[3,6), which in turn indexes the runs {8, 16, 20} as shown in the linear RLE compressed column 120. Inside these runs the index of t=4 can be easily calculated, for example in run 8: 4−0+8=12. Thus, one t=4 can be found at position 12 in the original column 110.

It is important to note that the additional binary search on the ranges column 430 exhibits more calculation overhead compared to the original run index 150. On the other hand, binary searching one column is still more efficient than scanning the entire column in a linear fashion. In addition, the ranging can also reduce the memory footprint significantly. The binary search can be omitted by sorting the table ID and time. This also improves the compression performance of linear run length encoding. Alternatively, it is also possible to create a second index on the ranges column 430. We do not prefer this option, since this index of a ranged run index 410 would have to be created together with the run index 150 and thus it increases the creation time and memory footprint, while the access time is not decreased compared to the sorted original column 110. However, in some situations, especially when inserting values in constant bulk loading frequency, it arises that the ranges column 430 is well formatted. This can be exploited by applying a constant ranging compression, which is described in FIG. 5.

Figure 5:
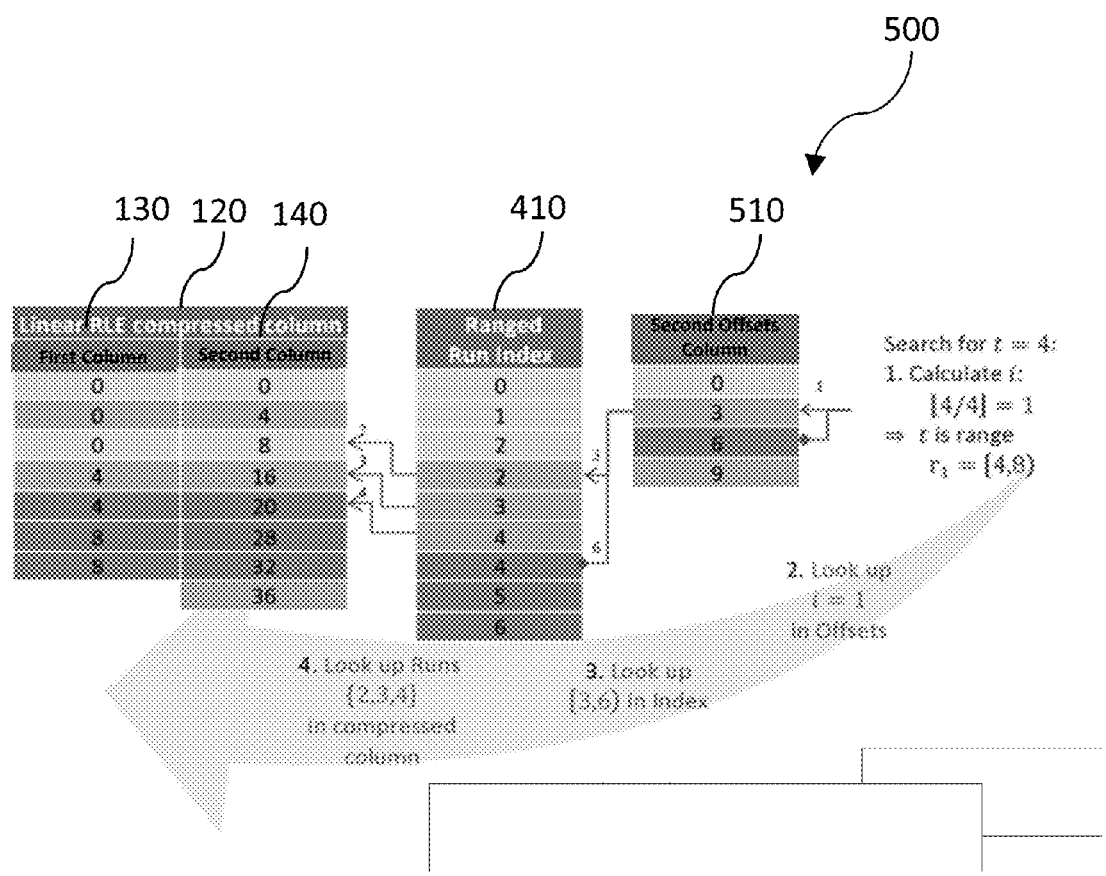
FIG. 5 is a diagram illustrating constant ranging compression.

FIG. 5 is a diagram 500 illustrating constant ranging compression. Instead of using an additional index on the ranges column, another optimization is to find a constant range size such that the values are uniformly divided into smaller ranges that describe the partitioning in the ranged run index 410. In general, constant ranging is a very simple approach. For a time series based on hours, instead of indexing each possible value separately, we index, for example, entire days, assuming that all values inside one day typically occur in the same runs.

In the example shown by FIG. 5, the constant range is 4. This means that the values 0 to inclusive 11 in the original column 110 (see FIG. 1 or FIG. 4) are partitioned by 4 such that the ranges [0,4), [4,8) and [8, 12) arise. By considering these values together we arrive at the second offset column 510 illustrated in FIG. 5. The advantage of a constant range in this case is that the ranges column referenced in FIG. 4 can be omitted. Instead, the range can be calculated using integer division by the range size: 4. Comparing this to the original run index (see FIG. 1) the second offsets column 510 positions are accessed not by t but t/4. In case of perfect regular bulk loading, like for example done by automated recording systems, the run index size is reduced by factor range-size. In our example 4, and in the daily bulk loading example by the number of distinct time stamps per day, e.g. 24, 48, or 96.

To determine a beneficial range size, we can use the greatest common divisor of run lengths, which incidentally can allow for different run lengths. To decrease the probability of a range size of 1, which is the worst case, the constant ranged run index 410 can be allowed to deliver false-positives. This means that the constant ranged run index 410 can combine run information for values which are mostly indexed equally. For instance, a value $t_0$, which can be found in the runs $\{0, 1, 2, 3\}$ can share a run partition with a value $t_1$ that can be found in the runs $\{0, 1, 2, 3, 10\}$. Doing so, scanning for $t_0$ will lead to a scan of run 10, in which $t_0$ is not present. This only as a minor issue, since it can be determined that the calculation of the actual position of $t_0$ is out of range, by detecting that i, determined by Eq. 1, is either smaller than the start position of the run or greater than the following run's start position.

Allowing false-positives, we are able to apply constant ranging to a ranged run index 410, while the amount of scanning in the ranged run index 410 is increased slightly. Still, the ranged run index 410 is able to reduce the search space to nearly each occurrence, which is a great benefit compared to a full column scan.

Figure 6:
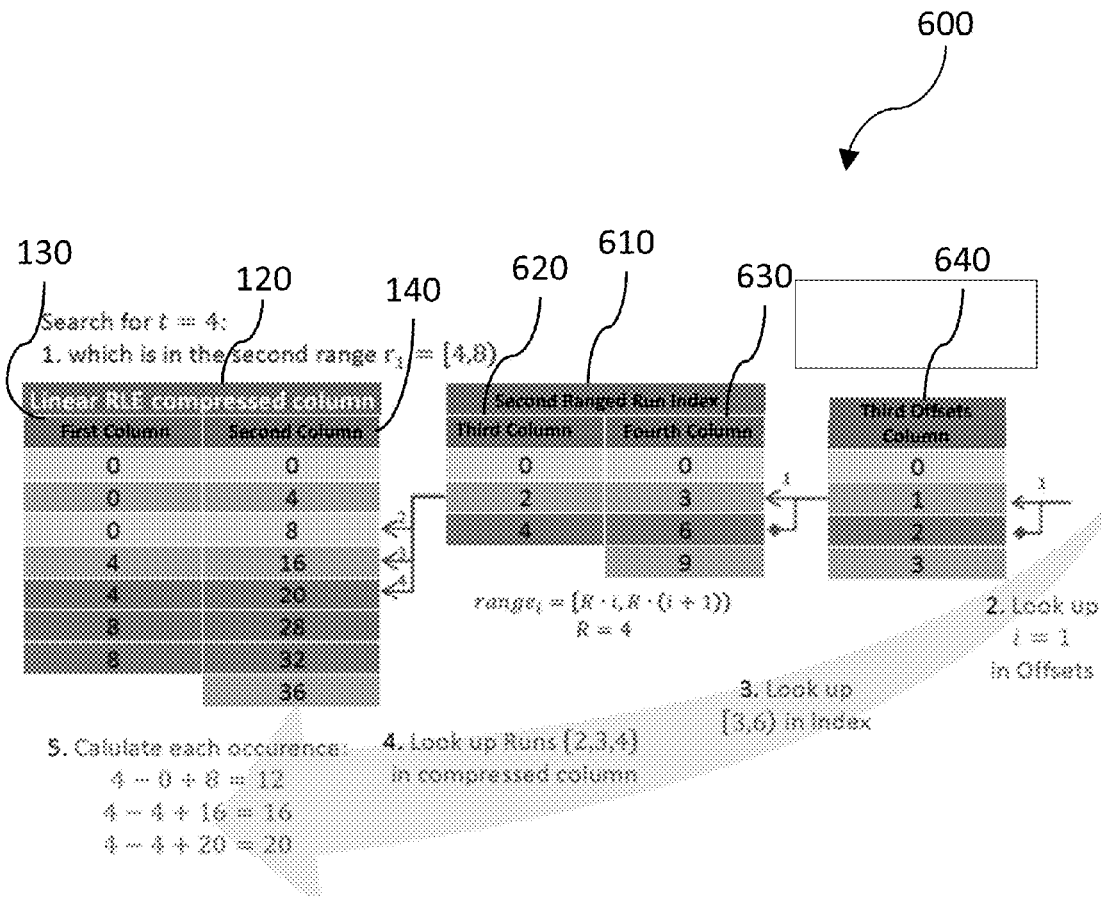
FIG. 6 is a diagram illustrating linear run length encoding compression.

FIG. 6 is a diagram 600 illustrating linear RLE compression. It can be seen in FIGS. 4 and 5 that the ranged run index 410 contains partitions, which in turn contain consecutive runs, for instance 0, 1, 2 or 2, 3, 4. This behavior can be observed often, such as when a point in time is added as part of multiple runs at a stretch, which is especially true for the bulk loading reflected in the original column 110. To eliminate this redundancy we can apply horizontal compression methods.

The benefit of creating a second ranged run index 610 with linear RLE can be seen by considering an energy example where, for one customer, sensor, etc. data is uploaded 96 times per day. For a million customers, loading additional 96 million values into the original column 110 adds an additional one million runs to the linear RLE compressed column 120. Accordingly, each value in the linear RLE compressed column 120 is specified with exactly these one million runs. In turn, the run index will contain, for each of the 96 values, one partition listing these consecutive one million runs. The number of partitions depends on the vertical optimization, but is at least one. Obviously, compressing a sequence: 1, 2, 3 . . . 1000000 from 1 million to two provides a huge benefit in terms of memory consumption and access time.

One horizontal compression technique can be to use linear RLE for the run index 150 itself, as illustrated in FIG. 6, in which a second ranged run index 610 using ranging with a constant range of 4 is displayed. The resulting second ranged run index 610 is split up into a third column 620 and a fourth column 640 containing start values and start positions, respectively. In addition, the semantics of the offsets column 420 is slightly changed, leading to the creation of a third offsets column 640. Originally, the offsets referred to partitions in the run index 150 by storing a partition's start position (its first row in the column) For a linear RLE compressed column 120 the third offsets column 640 still refers to the partitions in the run index 150, but in the second ranged run index 610 it points to the runs in the linear RLE compressed column 120.

For the original column 110, linear RLE can lead to a binary search when accessing it. In contrast, when applying linear RLE to a run index or a ranged run index, one is interested in the entire partition that corresponds to a value (or range) of interest. This means that we can exploit the iterative access beginning with the run indicated by the linear offset column in this case. Thus, a linear RLE compressed run index does not require an overhead in access time due to a binary search that exhibits a higher calculation complexity.

For example, when searching again for the value t=4 in the original column 110, the first step (due to the constant ranging) is to calculate the corresponding range, from the linear RLE compressed column 120, which is i=1 in this case. The second step is to look up i=1 in the third offset column. Since our example original column 110 has a beneficial order given by the strict bulk loading mechanism the column is well-formed: 0, 1, 2, 3, 4. Accordingly, both columns in the second run index 610 are accessed also at line 1 only and thus provide the runs [2,3,4]. The run length is calculated by accessing the start position of the next run: 6−3=3. Accordingly, this indicates that the value of interest, t=4 can be found by scanning the runs beginning with run 2. It is important to note that the first step arises from the ranging and thus is not done when applying linear RLE to a non-ranged run index.

Referring back to the energy example, the second ranged run index 610 for an original column 110 with 96 million rows contains three values in the second ranged run index and two values in the third offsets column, which has a constant range of 96. This is significantly less than the 96 million values in the uncompressed original column 110 or the one million values in the run index 150.

It is important to note that in our graphical example we used a strict insert order representing a bulk loading mechanism with a constant frequency of four time values. Accordingly, the third offsets column 640 contains a continuous sequence 0, 1, 2, etc. If bulk loading is not strictly enforced, this does not have to be the case. For example, the linear RLE compressed column 120 could contain multiple runs per partition. In this case the third offsets column 640 would not contain a consecutive sequence. However, in some situations, the offsets column can be omitted. This is the basis of the optimization in the next section.

Figure 7:
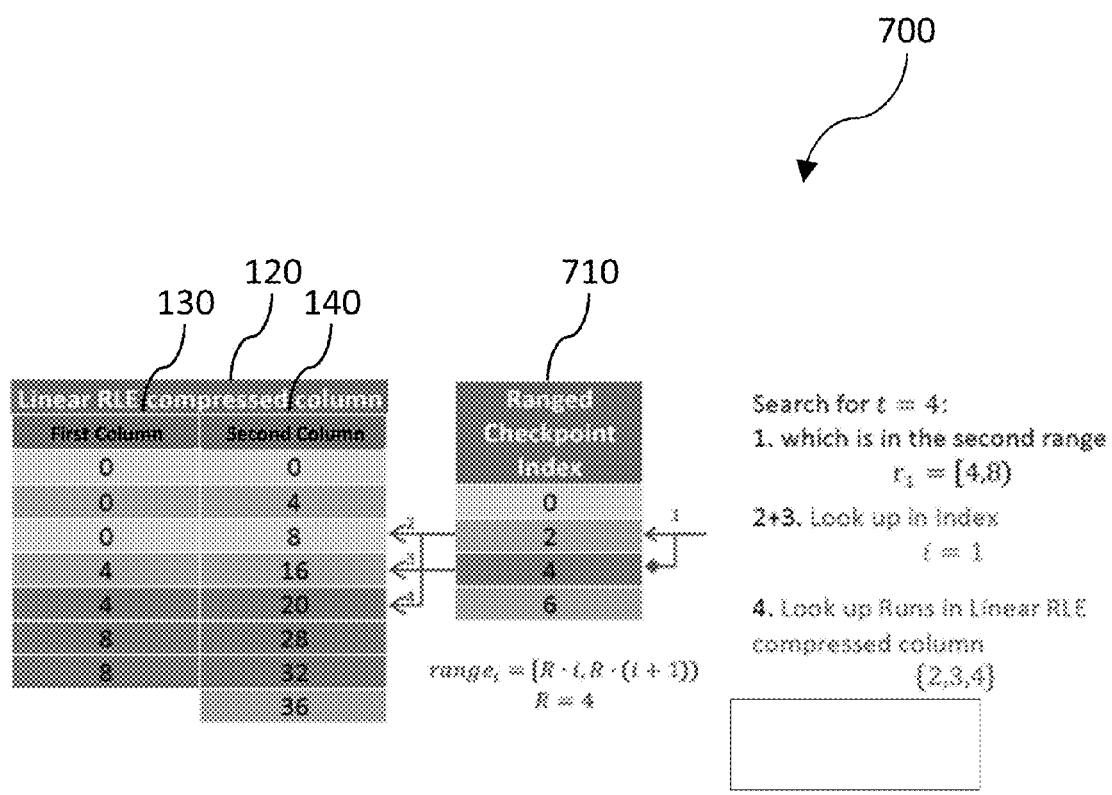
FIG. 7 is a diagram illustrating checkpoint compression.

FIG. 7 is a diagram 700 illustrating checkpoint compression. The consecutiveness of the offsets column leads to another approach for compression. As it can be seen in the example in FIGS. 2 and 5, the runs are nearly consecutive. In general, the runs deviate from a fully consecutive sequence (0, 1, 2, 3, 4, . . . ) only slightly. It contains some lines doubled: 2 and 4. These doubled occurrences appear due to the borders of two consecutive bulks. At these borders one run exists in the linear RLE compressed column 120, and the run contains values of both bulks. The principle of checkpoint compression is to list the borders of these bulks. Accordingly, when searching for a specific time value, the corresponding range is calculated as a first step, and then the index is accessed at the corresponding line. By accessing the corresponding line as well as its successor, the borders of the corresponding bulk becomes known. In turn, these borders indicate the positions of the linear RLE compressed column 120, which is of interest for the scan. In FIG. 7, an example of a search for t=4 is shown. A ranged checkpoint index 710 is accessed at position i=4/4=1 and its successor, i=2. This indicates directly that the runs [2,4], corresponding to positions 2,3,4 in the linear RLE compressed column 120 are of interest for a column scan.

Using checkpoints, the ranged checkpoint index 710 becomes significantly smaller than the run index 150 and additionally allows fast access. One disadvantage is that the ranged checkpoint index 710 requires a strict bulk loading mechanism, which in addition has to be scheduled in a fixed interval to combine the checkpoint compression with constant ranging. This is possible for automatic measurements, but cannot be assumed in general. A computer program, for example, can combine dynamically the vertical optimizations: dynamic ranging compression and constant ranging compression with the horizontal optimizations: linear RLE compression and checkpoint compression depending on the given situation. Each optimization exhibits a special pattern that can be found in the original column 110. The program can detect these patterns and apply a corresponding optimization, on which we elaborate further in the FIG. 8.

FIG. 8 is a diagram 800 illustrating features of a compression advisor. FIGS. 1-7 describe different compression and optimization strategies for a run index 150 that is applied on an original column 110. Two classes of compression were presented before: (1) vertical optimization, which focuses on the arrangement of column values, which might be indexed as a range of values and (2) horizontal optimization, which focuses on the compression of the run index content. For each class we proposed two different optimizations. Thus, together with the option to not enable any optimization this results in three options per class. To find the "best" strategy for a given original column 110, a compression adviser can automatically determine a suitable optimization or a combination of optimizations. The compression adviser can determine one horizontal and one vertical optimization. In general, they can be arbitrary combined, but not each combination is beneficial. To provide an overview for the different kinds of possibilities, FIG. 8 gives a summary of the benefits and deficits.

The rows in the table in FIG. 8 list the vertical optimizations. While no-ranging (i.e. no vertical compression) is applicable always, dynamic ranging compression is more restrictive. To apply dynamic-ranging compression, a bulk loading feature should be present. This means that no-ranging, which consumes maximal memory, is only needed for shuffled time columns with an unexpected ordering. In contrast, constant ranging compression requires a bulk loading at a constant frequency and is thus applicable most seldom, but provides fastest access. Accordingly, the compression adviser chooses the most restrictive, but possible, vertical optimization. In other words, in the table shown in FIG. 8, the compression adviser chooses the most bottom row that is applicable.

The columns in the table in FIG. 8 list the horizontal optimizations. Again, the option to choose no compression is always applicable. In contrast, checkpoint compression is only applicable when a strict bulk loading feature can be observed. Accordingly, it can be beneficial to combine checkpoint compression with any ranging. A less restrictive optimization is linear RLE compression, which can be applied when any form of bulk loading can be observed. Even if the bulk loading pattern cannot be observed in the entire original column 110, linear RLE compression might decrease the memory consumption. To make the determination if linear RLE compression should be used, we heuristically determine the average run length of the linear RLE compressed column 120. If the average run length is greater than two, then linear RLE compression will be applied. Afterwards, if the compressed run index exhibits greater memory consumption than the original run index (without horizontal compression) then the compressed version is dropped. In summary, the adviser chooses the horizontal compression that provides the lowest memory consumption. This means typically that checkpoint compression is applied if possible and afterwards linear RLE compression is applied if beneficial. In other words, in the table, the compression adviser picks the most right column that is applicable.

Figure 9:
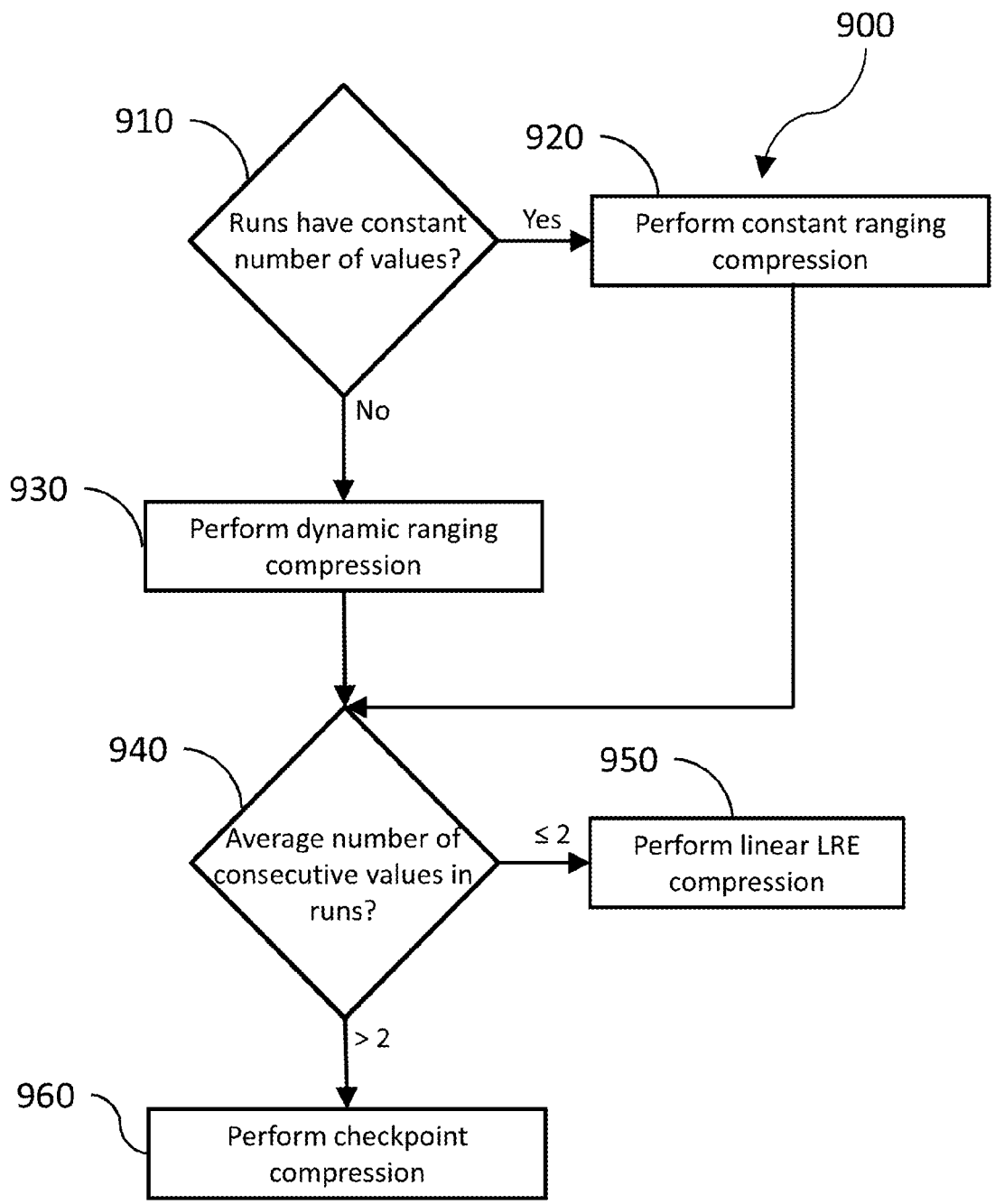
FIG. 9 is a process flow diagram illustrating determination of compression method by the compression advisor.

FIG. 9 is a process flow diagram illustrating determination of compression method by the compression advisor. This process outlines the features described in FIG. 8, above.

At 910, to determine the vertical compression method, it can be determined if the runs have a constant number of values.

At 920, if the runs have a constant number of values, then constant ranging compression, as described in FIG. 5, can be performed.

At 930, if the runs do not have a constant number of values, then dynamic ranging compression, as described in FIG. 4, can be performed.

At 940, to determine the horizontal compression method, the average number of consecutive values in the runs can be determined.

At 950, if the average number of consecutive values in the runs is less than or equal to two, then linear LRE compression, as described in FIG. 6, can be performed.

At 960, if the average number of consecutive values in the runs is greater than two, then checkpoint compression, as described in FIG. 7, can be performed. In addition to selecting compression schemes, based solely on the makeup of the runs, the memory demands resulting from the varying types of compressions can be taken into consideration. This feature is described in the next section.

Figure 10:
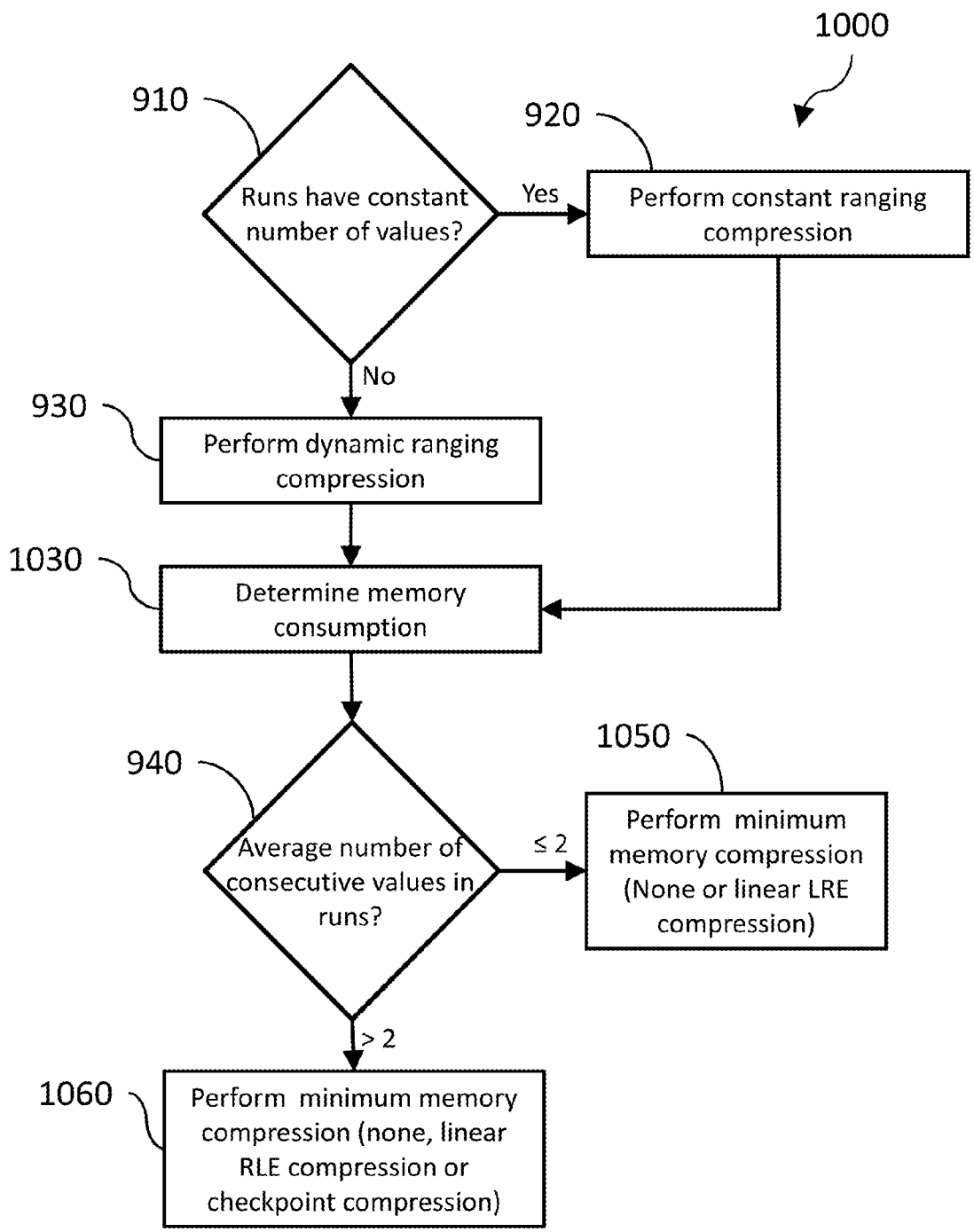
FIG. 10 is a process flow diagram illustrating a memory consumption optimized determination of compression method by the compression advisor.

FIG. 10 is a process flow diagram illustrating a memory consumption optimized determination of compression method by the compression advisor. Another implementation, which can include the features illustrated in diagram 800 of FIG. 8 and diagram 900 of FIG. 9 can further include the compression advisor optimizing the compression method depending on memory consumption that results from the various compression methods.

The determination of the vertical compression is unaffected by this optimization, therefore 910, 920, and 930 remain the same in this process.

After the vertical compression is determined, at 1030, a determination of memory consumption for three types of compression can be calculated: no compression, linear RLE compression, and checkpoint compression.

As in 940, the average number of consecutive values in the runs can be determined.

With this additional information, at 1050, if the number consecutive runs is less than or equal to two, then either no compression or linear RLE compression can be selected, depending on which compression method is more favorable in terms of memory consumption.

At 1060, if the number of consecutive runs is greater than two, then similar to 1050, a memory optimized method of compression can be selected from either no compression, linear RLE compression, or checkpoint compression.

Though the implementations described in FIGS. 9 and 10 begin with the determination of vertical compression and then horizontal compression, the order of operations can be reversed. For example, in FIG. 9, 940, and 950 or 960 can be performed first, and then 910 and 920 or 930. In diagram 1000 of FIG. 10, 1030, 940, and 1050 or 1060 can be performed first, and then 910 and 920 or 930.

Figure 11:
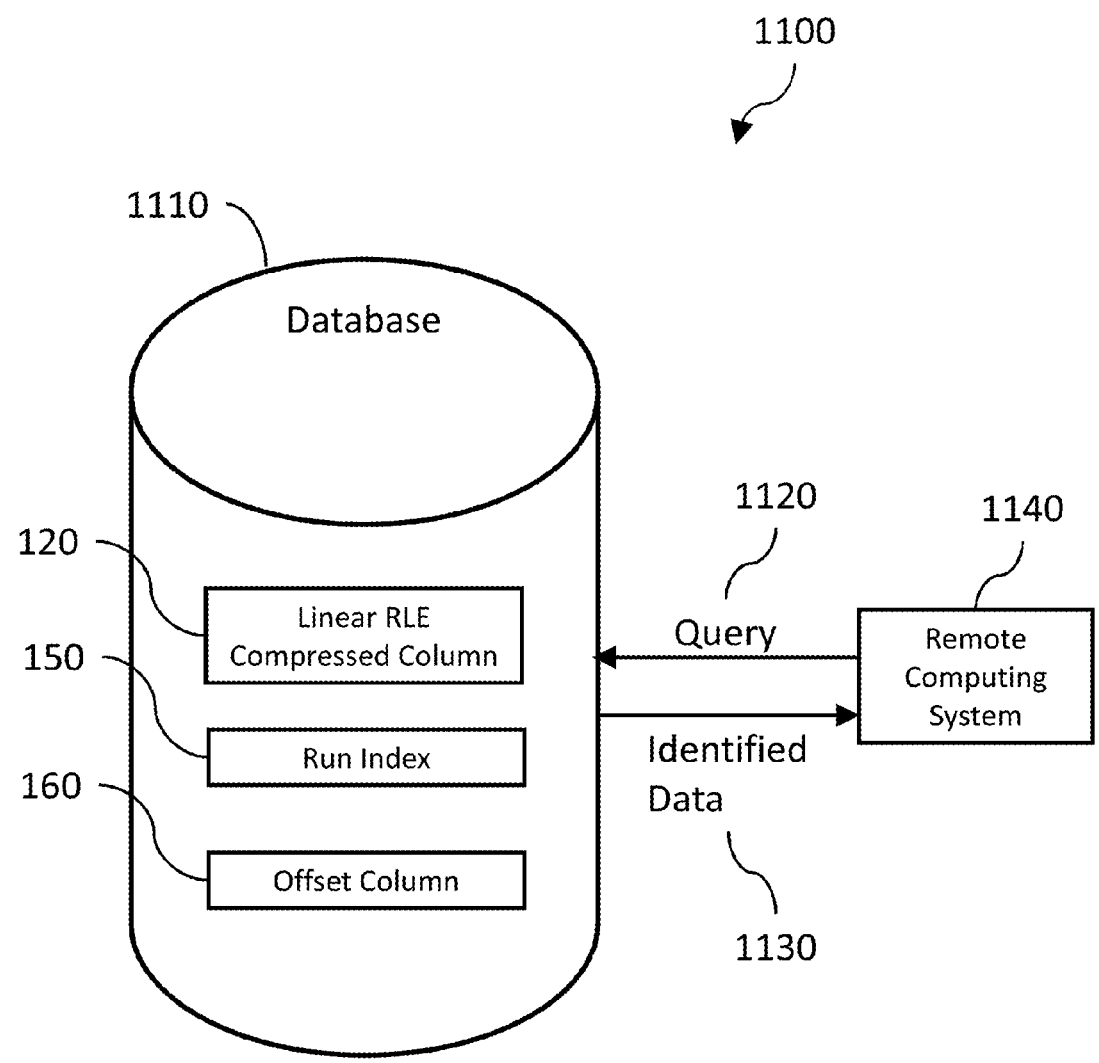
FIG. 11 is a diagram illustrating a system for accessing the database containing data from an original column compressed with run length encoding and run index compression.

FIG. 11 is a diagram 1100 illustrating a system for accessing the database containing data from an original column 110 compressed with run length encoding and run index compression. A remote computing system 1140, for accessing the database 1110, can be any connected computing system providing a query 1120 to the database 1110 storing the original column 110, which can be, for example the time-series data. The database 1110 can store, or optionally generate and store, the data structures described herein, for example, a linear RLE compressed column 120, a run index 150, an offset column 160, etc. Responsive to the query 1120, the database 1110 can access the original column 110 to return instances and/or their associated values, for the data requested in the query 1120. In the implementation described herein, typically the identified data 1130 will be the occurrences of a particular value in the time-series. Other types of identified data 1130 can be returned, such as pointers, tables, arrays, dictionaries, etc. that identify or represent the desired data to be identified in the original column 110. Also, the identified data 1130 can further include the time-series values associated with the time series. For example, if the query 1120 was drawn to returning all instances of a time-series having a value of 4, not only could the positions be returned to the remote computing system but also the values of the data at each position corresponding to the time-series having the value 4.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WiFi, and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving, by a database from a remote computing system, a query, the database comprising (i) a linear run length encoded compressed column, based on an original column of time series data partitioned into runs containing consecutive values and generated by run length encoding, (ii) a run index comprising at least one run index value having a run index position, the at least one run index value identifying runs in the original column, (iii) an offsets column identifying the run index positions corresponding to the runs that contain a desired value;
identifying, by the database using the run index, data responsive to the query; and
transmitting, by the database to the remote computing system, the identified data responsive to the query.

2. The method of claim 1, wherein:
the linear run length encoded compressed column comprises a first column and a second column, each having at least one value with a corresponding position; and
the position of the desired value in the original column is determined based on the desired value, the value in the first column, and the value in the second column.

3. The method of claim 2, wherein:
the run index is partitioned into at least one run partition having a run partition position;
the values of the run index correspond to the position in the first column and the second column; and
the run partition position of the run index corresponds to runs in the original column that contain the desired value.

4. The method of claim 3, wherein:
the offsets column comprises at least one offsets column value having an offsets column position; and
the offsets column value corresponds to the position of the run index and the desired value corresponds to the offset column position.

5. The method of claim 4, wherein the identifying comprises:
determining a first position in the offsets column that is the same as the desired value and a second position in the offsets column immediately subsequent to the first position;
determining a first range of positions in the run index beginning with the first position and continuing up to, but not including, the second position;
determining a second range of positions in the run length encoded compressed column that have the same positions in the run length encoded compressed column as the values in the determined range first range of positions; and
determining the positions of the desired value in the original column by, for each position in the second range, adding the desired value to the value of the second column corresponding to the position in the second range and subtracting the value of the first column corresponding to the position in the second range.

6. The method of claim 3, further comprising:
grouping the run partitions that are identical into a vertical grouping;
grouping the run partitions with consecutive run partition values into a horizontal grouping;
determining a vertical compression for the vertical grouping and a horizontal compression for the horizontal grouping; and
applying the vertical compression and the horizontal compression to the run index.

7. The method of claim 6, wherein the vertical compression is one of dynamic ranging compression or constant ranging compression.

8. The method of claim 7, wherein the database further comprises:
a ranged run index for constant ranging compression and comprising at least one value and a corresponding position, wherein the at least one value corresponds to the position in the second column; and
a second offsets column comprising at least one value and a corresponding position, wherein the value in the second offsets column corresponds to a starting position in the ranged run index, the difference between the values in the second offsets column determines a range of positions in the ranged run index, beginning with the starting position, and the position in the second offsets column corresponds to the range of values in the second column containing the desired value.

9. The method of claim 8, wherein the database further comprises:
a ranges column for dynamic ranging compression and comprising at least one value and a corresponding position, wherein the values in the ranges column correspond to a range in which the desired value is found, and the position corresponding to the range corresponds to the positions in the second offsets column.

10. The method of claim 6, wherein the horizontal compression is one of linear run length encoding compression or checkpoint compression.

11. The method of claim 10, wherein the database further comprises:
a second ranged run index for run length encoding compression and comprising a third column and a fourth column, each having at least one value having a corresponding position, wherein the value of the third column corresponds to the position in the first column and the position in the second column, and the difference of consecutive values in the fourth column corresponds to a range of positions in the first and second column, starting with the position in the second column determined by the value in the third column; and
a third offsets column comprising at least one value having a corresponding position, wherein the value in the third offsets column corresponds to a starting position in the fourth column of the second ranged run index, the difference between the values in the third offsets column determines a range of positions in the second ranged run index, beginning with the starting position, and the position in the third offsets column corresponds to the range of values in the second column containing the desired value.

12. The method of claim 10, wherein the database further comprises:
a ranged checkpoint index for ranged checkpoint compression and comprising at least one value having a corresponding position, wherein the value in the ranged checkpoint index corresponds to a starting position in the linear run length encoded compressed column, the difference between the values in the ranged checkpoint index determines a range of positions in the linear run length encoded compressed column, beginning with the starting position, and the position in the ranged checkpoint index corresponds to the range of values in the second column containing the desired value.

13. The method of claim 6, wherein the determining further comprises:
performing constant ranging compression when the original column contains runs having a constant number of values;
performing dynamic ranging compression when the original column contains runs having a varying number of values;
determine an average number of consecutive values in the runs;
performing linear run length encoding compression when the average number is two or less; and
performing checkpoint compression when the average number is greater than two.

14. The method of claim 13, further comprising:
determining a first memory consumption for no horizontal compression, a second memory consumption for linear run length encoding compression, and a third memory consumption for checkpoint compression; and
compressing the original column according to the compression corresponding to the lowest of the first memory consumption, the second memory consumption, and the third memory consumption.

15. A system comprising:
at least one data processor; and
memory storing instructions which, when executed by the at least one data processor, result in operations comprising:
receiving, by a database from a remote computing system, a query, the database comprising (i) a linear run length encoded compressed column, based on an original column of time series data partitioned into runs containing consecutive values and generated by run length encoding, (ii) a run index comprising at least one run index value having a run index position, the at least one run index value identifying runs in the original column, (iii) an offsets column identifying the run index positions corresponding to the runs that contain a desired value;
identifying, by the database using the run index, data responsive to the query; and
transmitting, by the database to the remote computing system, the identified data responsive to the query.

16. The system of claim 15, wherein:
the linear run length encoded compressed column comprises a first column and a second column, each having at least one value with a corresponding position; and
the position of the desired value in the original column is determined based on the desired value, the value in the first column, and the value in the second column.

17. The system of claim 16, wherein:
the run index is partitioned into at least one run partition having a run partition position;
the values of the run index correspond to the position in the first column and the second column; and
the run partition position of the run index corresponds to runs in the original column that contain the desired value.

18. The system of claim 17, wherein:
the offsets column comprises at least one offsets column value having an offsets column position; and
the offsets column value corresponds to the position of the run index and the desired value corresponds to the offset column position.

19. The system of claim 18, wherein the operations further comprise:
grouping the run partitions that are identical into a vertical grouping;
grouping the run partitions with consecutive run partition values into a horizontal grouping;
determining a vertical compression for the vertical grouping and a horizontal compression for the horizontal grouping; and
applying the vertical compression and the horizontal compression to the run index.

20. A non-transitory computer program product storing instructions which, when executed by at least one data processor forming part of at least one computing device, result in operations comprising:
receiving, by a database from a remote computing system, a query, the database comprising (i) a linear run length encoded compressed column, based on an original column of time series data partitioned into runs containing consecutive values and generated by run length encoding, (ii) a run index comprising at least one run index value having a run index position, the at least one run index value identifying runs in the original column, (iii) an offsets column identifying the run index positions corresponding to the runs that contain a desired value;
identifying, by the database using the run index, data responsive to the query; and
transmitting, by the database to the remote computing system, the identified data responsive to the query.

* * * * *